United States Patent
Qi et al.

(10) Patent No.: US 8,801,889 B2
(45) Date of Patent: Aug. 12, 2014

(54) WATER JET SHAPING OF DISPLAYS AND STRUCTURES FOR ELECTRONIC DEVICES

(75) Inventors: Jun Qi, Cupertino, CA (US); Wayne H. Fu, Mountain View, CA (US); Chenhui Wang, Cupertino, CA (US); Kuanying Lin, Mountain View, CA (US); Nathan K. Gupta, San Francisco, CA (US); Victor H. Yin, Cupertino, CA (US); Silvio Grespan, Shanghai (CN)

(73) Assignee: Apple Inc., Cupertino, CA (US)

( * ) Notice: Subject to any disclaimer, the term of this patent is extended or adjusted under 35 U.S.C. 154(b) by 606 days.

(21) Appl. No.: 13/021,526

(22) Filed: Feb. 4, 2011

(65) Prior Publication Data
US 2012/0200480 A1 Aug. 9, 2012

(51) Int. Cl.
| B32B 38/00 | (2006.01) |
| B32B 38/04 | (2006.01) |
| B32B 38/10 | (2006.01) |
| G02F 1/1333 | (2006.01) |
| B26F 3/00 | (2006.01) |

(52) U.S. Cl.
CPC ............ *B26F 3/00* (2013.01); *G02F 1/133351* (2013.01)
USPC ............ 156/253; 156/250; 156/252; 156/256

(58) Field of Classification Search
USPC .................................. 156/250, 252, 253, 256
See application file for complete search history.

(56) References Cited

U.S. PATENT DOCUMENTS

| 4,814,296 | A | * | 3/1989 | Jedlicka et al. ................. 438/68 |
| 5,599,413 | A | | 2/1997 | Nakao et al. |
| 6,512,196 | B1 | | 1/2003 | Yoon et al. |
| 6,612,910 | B1 | | 9/2003 | Hirano et al. |
| 2007/0188688 | A1 | * | 8/2007 | Hwang et al. ................. 349/122 |
| 2007/0200835 | A1 | | 8/2007 | Choo et al. |
| 2009/0049773 | A1 | * | 2/2009 | Zadesky et al. ............ 52/204.62 |
| 2009/0257189 | A1 | * | 10/2009 | Wang et al. .............. 361/679.56 |

FOREIGN PATENT DOCUMENTS

WO 0157638 8/2001

\* cited by examiner

*Primary Examiner* — Mark A Osele
*Assistant Examiner* — Christopher C Caillouet
(74) *Attorney, Agent, or Firm* — Treyz Law Group; G. Victor Treyz; Kendall P. Woodruff

(57) ABSTRACT

Structures such as display structures and other electronic device structures may be shaped using water jet cutting equipment. The water jet cutting equipment may be used to produce a water jet. The water jet may be used to cut layer of material such as display layers and other structures. Water jet cutting may form edge cuts, cuts for openings in the structures, chamfers, and other features. Multiple layers may be simultaneously cut using water jet cutting. Positioning equipment may be used to control the position of a workpiece relative to a water jet nozzle. The positioning equipment may be controlled using a control unit. During water jet cutting operations, the workpiece may be trimmed, openings may be formed, and features such as chamfers may be created. A workpiece may include a cover glass, a color filter array, a thin-film transistor layer, and other display layers and device structures.

17 Claims, 9 Drawing Sheets

WATER JET SHAPING OF DISPLAYS AND STRUCTURES FOR ELECTRONIC DEVICES

BACKGROUND

This relates generally to manufacturing techniques for electronic devices, and, more particularly, to shaping device structures such as display structures.

Displays are widely used in electronic devices to display images. Displays such as liquid crystal displays display images by controlling liquid crystal material associated with an array of image pixels. A typical liquid crystal display has a color filter layer and a thin film transistor layer between which the liquid crystal material is interposed. A cover glass layer is often used to protect the surface of an electronic device display.

The material that is used in forming display layers such as color filter array layers, thin-film-transistor layers, and cover glass layers may be provided in large panels referred to as mother glass. The mother glass is typically singulated into device-sized pieces using a scribing and breaking process. Device-sized display layers may then be laminated together to form displays. In some situations, mechanical milling machines may be used to mill openings into glass layers. For example, the cover glass layer of a display may be provided with a speaker port opening using milling techniques.

Conventional singulation techniques based on scribing and breaking can only be used to form straight cuts, limiting their applicability. Conventional milling techniques may require multiple passes when forming certain shapes to avoid stress buildup, which can reduce throughput and limit the types of features that can be incorporated into a glass layer.

It would therefore be desirable to be able to provide enhanced techniques for manufacturing electronic device structures.

SUMMARY

Structures such as display structures and other electronic device structures may be shaped using water jet cutting equipment. The water jet cutting equipment may use computer-controlled positioners to position a workpiece relative to a water jet. The water jet may be formed from a high-pressure stream of water that includes abrasive particles such as garnet or aluminum oxide particles.

The position of the workpiece relative to the water jet may be adjusted so that the water jet shapes the workpiece. The water jet may be used to cut or trim the edges of the workpiece, may be used to form notches and openings in the workpiece, and may be used to shape other features in the workpiece such as recesses, grooves, and chamfers.

The workpiece may include one or more display layers such as a cover glass layer, a color filter array layer, and a thin-film transistor layer. The workpiece may also include housing structures and other device structures.

Multiple layers may be simultaneously cut using water jet cutting. For example, layers of glass, metal, fiber-composite material, and ceramic may be simultaneously cut. One or more layers of a display or other structures may be simultaneously water jet cut. For example, water jet cutting may be used to trim the edge of a laminated set of display layers and other device structures.

Further features of the invention, its nature and various advantages will be more apparent from the accompanying drawings and the following detailed description of the preferred embodiments.

DETAILED DESCRIPTION

Displays are widely used in electronic devices. For example, displays may be used in computer monitors, laptop computers, media players, cellular telephones and other handheld devices, tablet computers, televisions, and other equipment. Displays may be based on plasma technology, organic light-emitting-diode technology, liquid crystal structures, etc.

Figure 1:
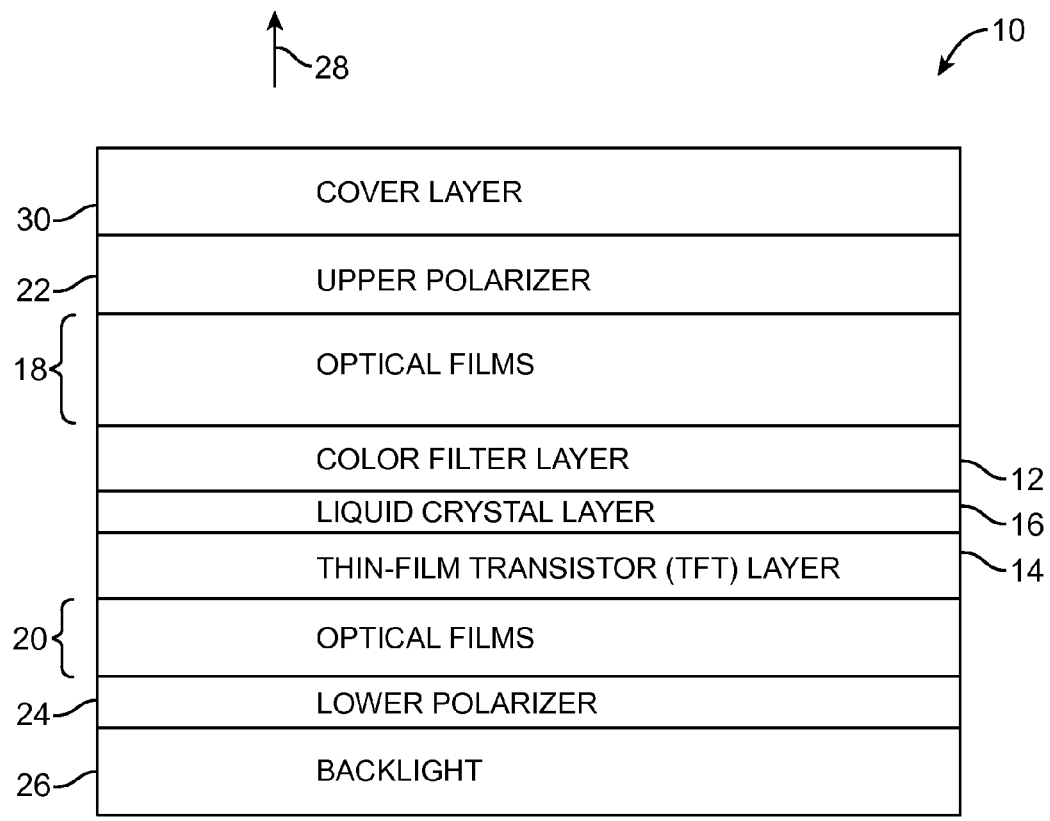
FIG. 1 is a cross-sectional side view of an illustrative display such as a liquid crystal display of the type that may be formed using water jet cutting techniques in accordance with an embodiment of the present invention.

A cross-sectional side view of an illustrative display of the type that may be incorporated into an electronic device is shown in FIG. 1. The illustrative display of FIG. 1 is a liquid crystal display (as an example). Other types of displays may be provided for electronic devices if desired.

As shown in FIG. 1, display 10 may include color filter (CF) layer 12 (sometimes referred to as a color filter array layer) and thin-film-transistor (TFT) layer 14. Color filter layer 12 may include an array of colored filter elements. In a typical arrangement, the pixels of layer 12 each include three types of colored pixels (e.g., red, green, and blue subpixels). Liquid crystal (LC) layer 16 includes liquid crystal material and is generally interposed between color filter layer 12 and thin-film-transistor layer 14. Thin-film-transistor layer 14 may include electrical components such as thin film transistors, capacitors, and electrodes for controlling the electric fields that are applied to liquid crystal layer 16.

Optical film layers 18 and 20 may be formed above and below color filter layer 12, liquid crystal layer 16, and thin-film-transistor layer 14. Optical films 18 and 20 may include structures such as quarter-wave plates, half-wave plates, diffusing films, optical adhesives, and birefringent compensating layers.

Display 10 may have upper and lower polarizer layers 22 and 24. Backlight 26 may provide backside illumination for display 10. Backlight 26 may include a light source such as a strip of light-emitting diodes. Backlight 26 may also include a light-guide plate and a back reflector. The back reflector may be located on the lower surface of the light-guide panel to prevent light leakage. Light from the light source may be injected into an edge of the light-guide panel and may scatter upwards in direction 28 through display 10.

Cover layer 30 may be used to cover and protect the underlying layers of display 10 that are shown in FIG. 1. Cover layer 30 and the other layers of display 10 shown in FIG. 1 may be formed from material such as glass, plastic, ceramic, etc. For example, cover layer 30 may be formed form a glass sheet (i.e., a cover glass layer) or a polymer layer. Color filter layer 12 and thin-film transistor layer 16 may also be formed from glass substrates or may be formed from polymer substrates (as examples). The light guide plate in backlight 26 and the other layers shown in FIG. 1 may be formed from polymers (as an example). Other configurations may also be used (e.g., configurations for display 10 that omit cover layer 30, configurations for display 10 in which display layers are formed from ceramic or other materials, etc. The arrangement shown in FIG. 1 is merely illustrative.

If desired, touch sensor structures may be incorporated into one or more of the layers of display 10. In a typical touch sensor configuration, an array of capacitive touch sensor electrodes may be implemented using pads and/or strips of a transparent conductive material such as indium tin oxide. Other touch technologies may be used if desired (e.g., resistive touch, acoustic touch, optical touch, etc.). Indium tin oxide or other transparent conductive materials or non-transparent conductors may also be used in forming signal lines in display 10 (e.g., structures for conveying data, power, control signals, etc.). Touch sensor structures can be formed on the layers shown in FIG. 1 or on a separate substrate of plastic, glass, ceramic, or other suitable material that is interposed among the layers of FIG. 1.

In black and white displays, color filter layer 12 can be omitted. In color displays, color filter layer 12 can be used to impart colors to an array of image pixels. Each image pixel may, for example, have three corresponding liquid crystal diode subpixels. Each subpixel may be associated with a separate color filter element in the color filter array. The color filter elements may, for example, include red (R) color filter elements, blue (B) color filter elements, and green (G) color filter elements. These elements may be arranged in rows and columns. For example, color filter elements can be arranged in stripes across the width of display 10 (e.g., in a repeating patterns such as a RBG pattern or BRG pattern) so that the color filter elements in each column are the same (i.e., so that each column contains all red elements, all blue elements, or all green elements). By controlling the amount of light transmission through each subpixel, a desired colored image can be displayed.

The amount of light transmitted through each subpixel can be controlled using display control circuitry and electrodes. Each subpixel may, for example, be provided with a transparent indium tin oxide electrode. The signal on the subpixel electrode, which controls the electric field through an associated portion of the liquid crystal layer and thereby controls the light transmission for the subpixel, may be applied using a thin film transistor. The thin film transistor may receive data signals from data lines and, when turned on by an associated gate line, may apply the data line signals to the electrode that is associated with that thin-film transistor. Thin-film transistors may be provided in an array on thin-film transistor layer 14.

Figure 2A:
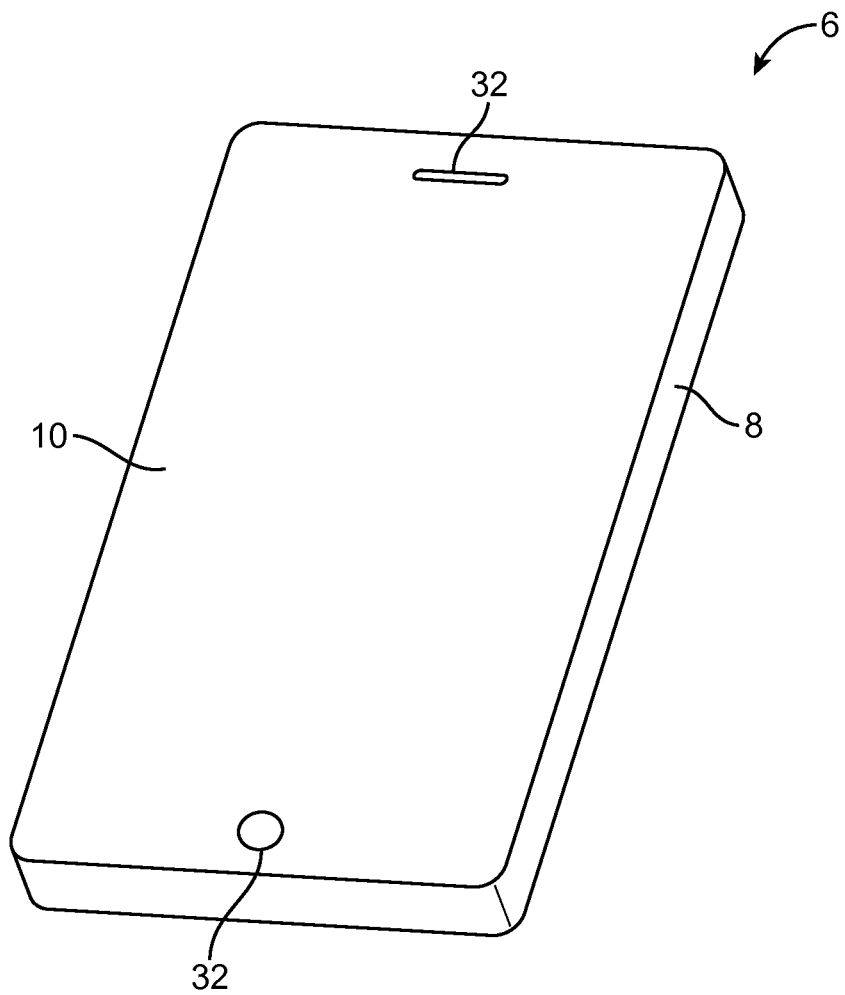
FIG. 2A is a perspective view of an illustrative electronic device such as a handheld electronic device that may be provided with a display and other components that have been shaped using water jet cutting techniques in accordance with an embodiment of the present invention.

A perspective view of an illustrative electronic device such as a handheld electronic device that may be provided with a display such as display 10 of FIG. 1 is shown in FIG. 2A. As shown in FIG. 2A, electronic device 6 may have a housing such as housing 8. Housing 8 may be formed from materials such as plastic, glass, ceramic, metal, fiber composites, and combinations of these materials. Housing 8 may have one or more sections. In the arrangement of FIG. 2A, device 6 has a front face and a rear face. Display 10 may be mounted on the front face of housing 8. Openings 32 may be provided in display 10. For example, openings 32 may be used to form speaker ports, button openings, and other openings in cover layer 30 of display 10.

Figure 2B:
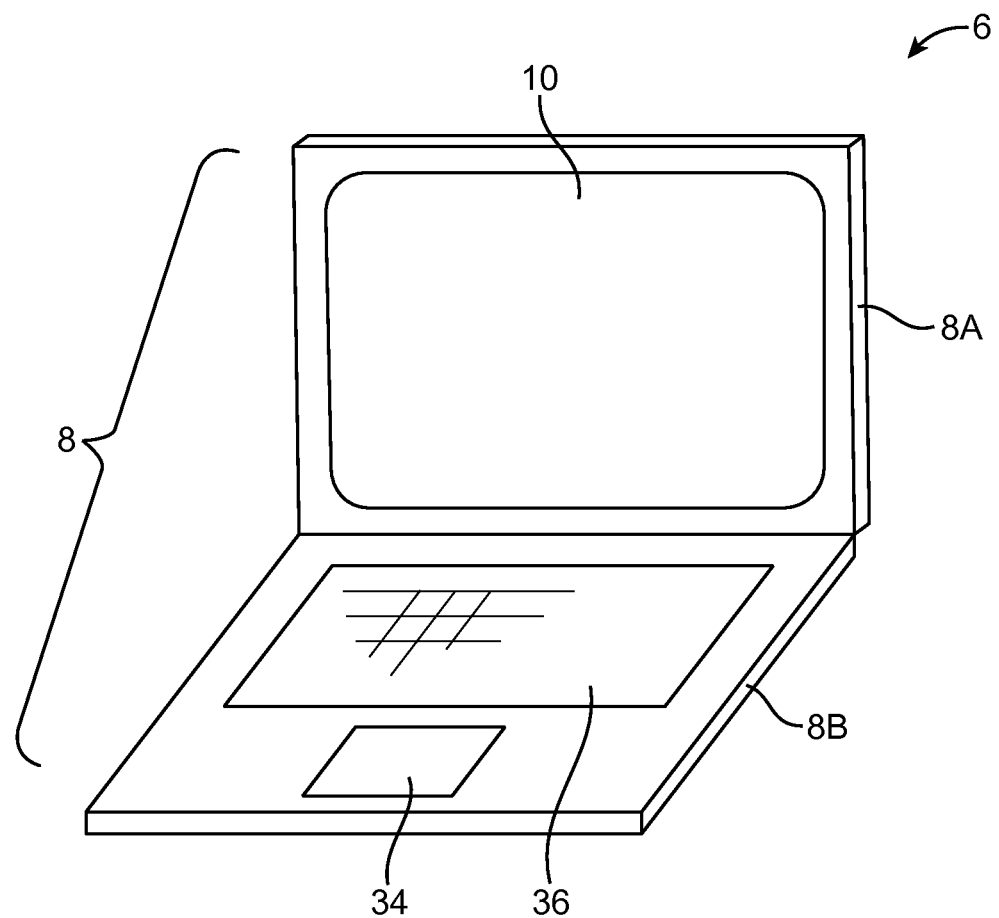
FIG. 2B is a perspective view of an illustrative electronic device such as a portable computer that may be provided with a display and other components that have been shaped using water jet cutting techniques in accordance with an embodiment of the present invention.

A perspective view of another illustrative electronic device of the type that may be provided with a display such as display 10 of FIG. 1 is shown in FIG. 2B. In the example of FIG. 2B, housing 8 has upper portion 8A and lower portion 8B. Portions 8A and 8B may be attached using a hinge. Upper portion 8A may be used to house display 10. Processing circuitry and input-output components such as track pad 34 and keyboard 36 may be provided in lower portion 8B. Device 6 of FIG. 2B may be, for example, a portable computer.

In other illustrative electronic devices (e.g., tablet computers, music players, etc.), displays such as display 10 and other electronic device components may be mounted in housings 8 with other configurations. The display mounting arrangements of FIGS. 2A and 2B are merely illustrative.

In fabricating device structures such as housing 8 of device 6, display 10, and other device components, it may be desirable to use water jet cutting techniques. Water jet cutting equipment may produce a jet of abrasive-laden water that can cut through materials such as glass, plastic, metal, ceramic, carbon fiber and other fiber-based composite materials, etc. Unlike tools based on mechanical cutting such as milling machines and drills, water jet cutting equipment is not prone to tool wear. This can extend equipment life and maximizing uptime during manufacturing. Water jet cutting techniques may also be used to form component shapes such as shapes with curved edges that are generally not possible using conventional scribing and breaking equipment.

Components that may be shaped using water jet cutting equipment include device housing structures such as parts of housing 8, display structures such as one or more layers of display 10 (e.g., one or more of the layers of display 10 shown in FIG. 1), internal structures in device 10 such as brackets and other mounting structures (e.g., internal housing structures), etc. Water jet cutting may be used to form cuts (e.g., to cut apart different parts of a workpiece), eased edges (e.g., chamfers or other edge treatments), openings (e.g., circular holes, rectangular holes, or holes with other curved and/or straight edges), recesses, grooves, notches, and other features in device components. For example, water jet cutting equipment may be used to cut layers of display structures from mother glass and may be used to trim and otherwise shape the edges of display structures. Water jet cutting equipment may be used to form holes in display structures such as cover glass layers and may be used in cutting through multiple layers of different materials in a single pass. These techniques may, if desired, be used in combination with milling techniques, molding techniques, and other component shaping techniques.

Figure 3:
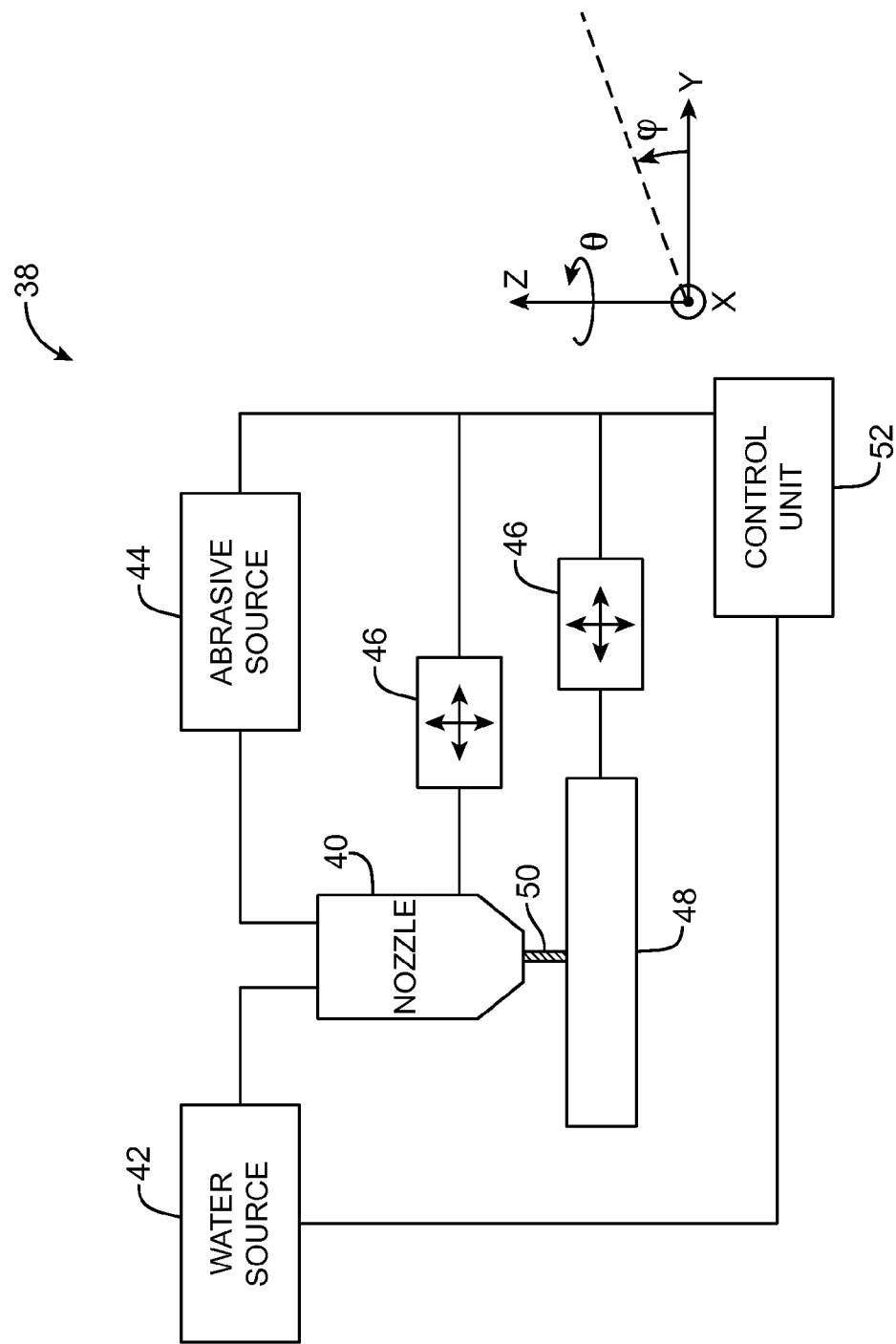
FIG. 3 is a diagram of a water jet cutting system of the type that may be used to shape display components and other electronic device components in accordance with an embodiment of the present invention.

Illustrative water jet equipment of the type that may be used in shaping display structures and other electronic device components for device 6 are shown in FIG. 3. As shown in FIG. 3, water jet cutting equipment 38 may include a nozzle such as nozzle 40. High-pressure water may be provided to nozzle 40 from water source 42 (e.g., a high-pressure water pump). Abrasive from abrasive source 44 may be combined with the water. During operation of water jet cutting equipment 38, a high-velocity water jet such as water jet 50 of FIG. 3 that includes the added abrasive is directed onto workpiece 48 by nozzle 40. The abrasive that is supplied by abrasive source 44 may include garnet particles, aluminum oxide particles, or other particles of abrasive material.

Positioning equipment 46 may be used to adjust the position of nozzle 40 and/or workpiece 48 parallel to axes X, Y, and Z and may be used to adjust the angular positions of nozzle 40 and/or workpiece 48 (e.g., with respect to rotational angle θ and one or more tilt angles such as tilt angle φ). Positioning equipment 46 may include motors, solenoids, and other positioners that are controlled by control unit 52. Control unit 52 may be based on a computer or other computing equipment and may be used in controlling the behavior of water jet 50 (e.g., by adjusting the water pressure produced by water source 42 and/or the amount and type of abrasive introduced into nozzle 40 by abrasive source 44).

Workpiece 48 may include one or more layers of material such as one or more layers of plastic (polymer), glass, ceramic, fiber-composite, metal, wood, adhesive, or other materials. Workpiece 48 may include one or more layers associated with display 10 such as cover layer 30, color filter layer 12, thin-film transistor layer 14, and the other layers of material of display 10 of FIG. 1 or other suitable display layers, may include one or more layers of housing material (e.g., plastic housing structure, metal housing structures, fiber-composite housing structures, glass housing structures, ceramic housing structures, internal housing structures, external housing structures, sidewall structures, display bezel structures, other electronic device components, etc.), and may include combinations of such structures (e.g., housing structures and/or display layers in combination with other device structures).

Figure 4:
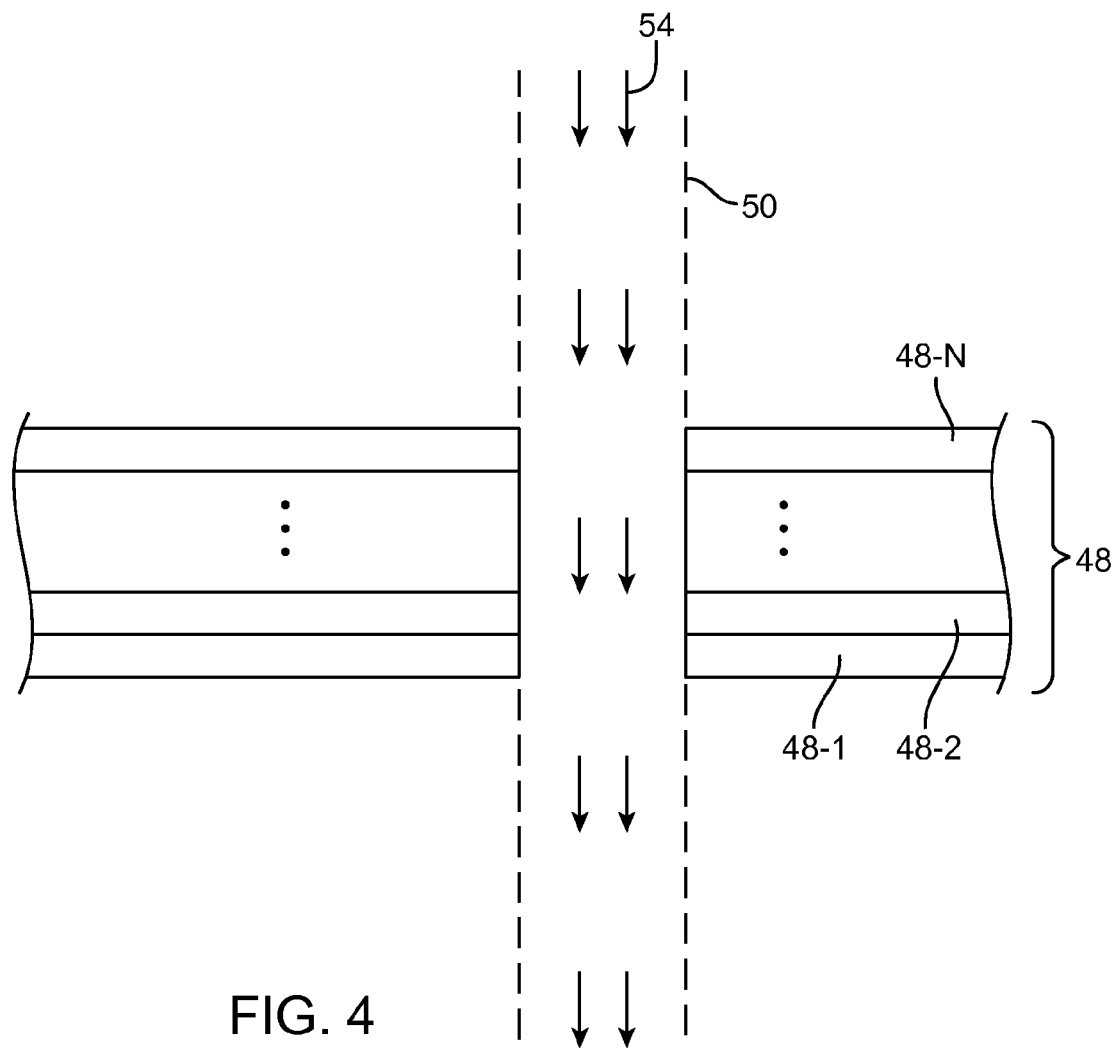
FIG. 4 is a side view of an illustrative workpiece such as one or more display layers or other structures during water jet cutting in accordance with an embodiment of the present invention.

A cross-sectional side view of workpiece 48 during shaping operations using water jet cutting equipment 38 of FIG. 3 is shown in FIG. 4. Workpiece 48 of FIG. 4 may include one or more layers such as layers 48-1, 48-2, . . . 48-N. The layers of workpiece 48 may be connected to each other using layers of adhesive or other suitable fastening mechanisms.

As shown in FIG. 4, water jet 50 may be projected in direction 54 to simultaneously cut through one or more of layers 48-1, 48-2, and 48-N. This type of simultaneous cutting operation may be performed even in scenarios in which different workpiece layers have different materials properties (e.g., different hardness values), different thicknesses, etc. By moving nozzle 40 in a pattern with straight and/or curved edges of a desired shape (e.g., by moving nozzle 40 in plane perpendicular to direction 54) while directing water jet 50 through one or more different layers of workpiece 48, workpiece 48 can be formed (e.g., trimmed or otherwise cut) into a variety of different shapes. As an example, a display with one or more display layers may be formed into a shape with rounded corners (see, e.g., FIG. 2B) or other curved edges. Structures that include display layers and other structures (e.g., housing structures or other device structures) may also be cut using water jet 50. For example, structures that include combinations of glass and other materials (e.g., plastic, metal, fiber-composites, ceramic, etc.) may be shaped using water jet 50.

Figure 5:
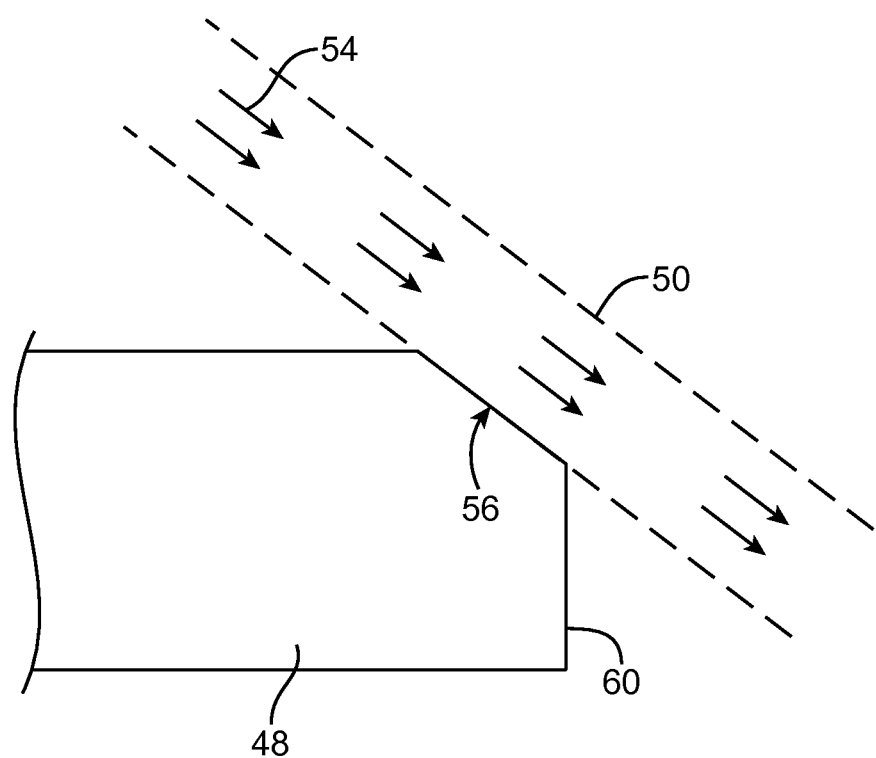
FIG. 5 is a side view of an illustrative workpiece such as a display component or other electronic device component during shaping operations such as chamfering operations in accordance with an embodiment of the present invention.

As shown in FIG. 5, features may be formed in workpiece 48 such as chamfer 56 by tilting workpiece 48 relative to water jet 50 during cutting operations (e.g., by adjusting positioners 46 under control of control unit 52 to set an appropriate value for tilt angle φ). Workpiece 48 may be, for example, a display structure such as cover layer 30 or other layer in display 10, a housing structure (e.g., housing 8 of device 6), or other electronic device structure. Chamfer 56 may be formed as part of a multi-pass process in which a straight (vertical) water jet cut is used in a first pass to form straight sidewall 60 (e.g., by cutting through one or more layers of workpiece 48 around the peripheral edge of the workpiece), followed by an additional pass in which workpiece 48 is angled with respect to water jet 50 to cut away sidewall material in the shape of chamfer 56. Techniques with additional passes or cutting arrangements in which different types of features are formed in workpiece 48 may also be performed using equipment 38 if desired.

Figure 6:
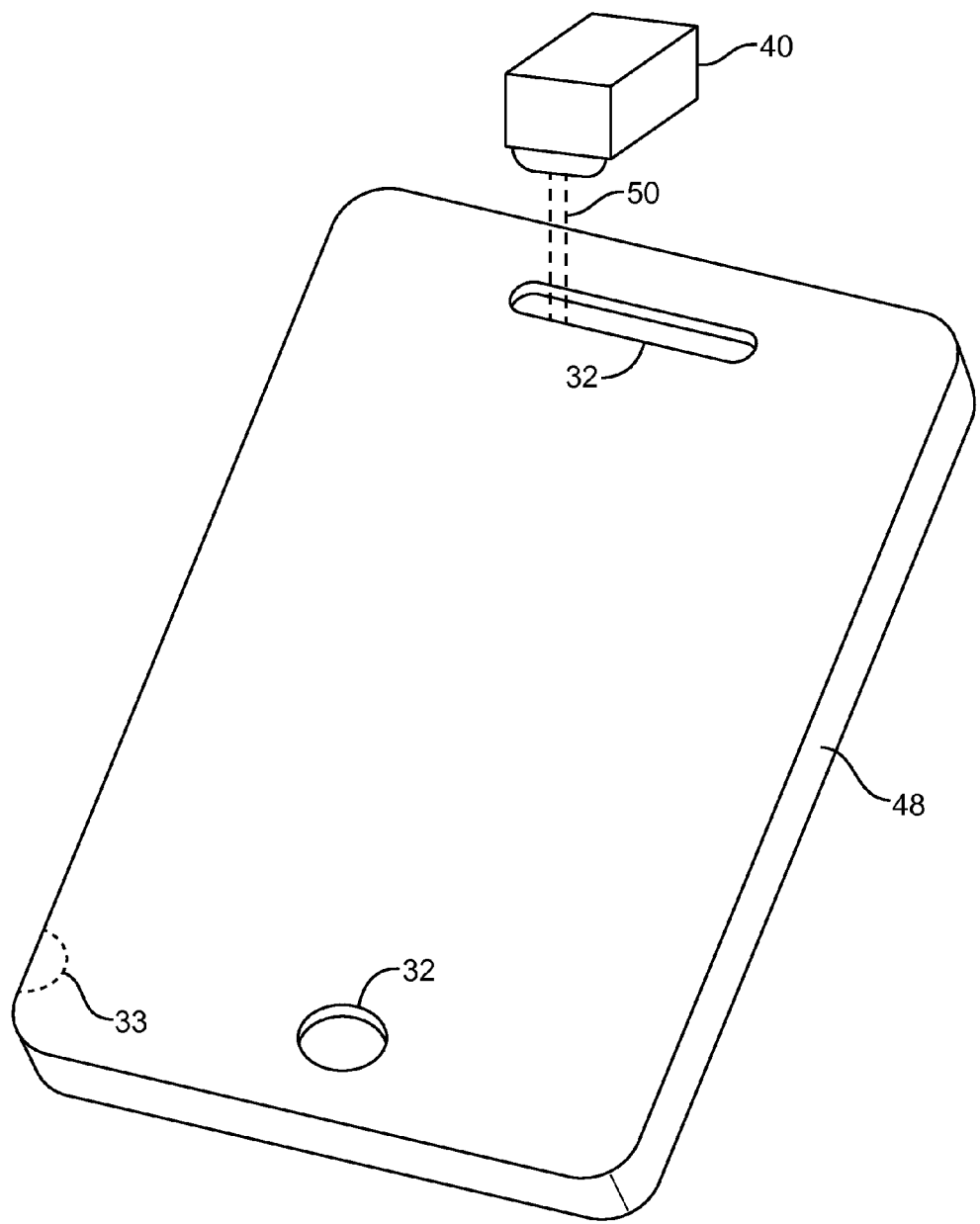
FIG. 6 is a perspective view of an electronic device component such as a display showing how notches and openings in the display may be formed using water jet cutting in accordance with an embodiment of the present invention.

As shown in the perspective view of illustrative workpiece 48 of FIG. 6, water jet 50 may be used in cutting openings such as openings 32 in workpiece 48. Workpiece 48 of FIG. 6 may be a cover layer such as cover layer 30 of FIG. 1, other display layers in display 10, housing structures such as housing 8, other device structures, layers of multiple materials (e.g., multiple layers of display 10 such as color filter layer 12, thin-film transistor layer 14, cover layer 30, and/or layers of metal, ceramic, polymer, etc.), or other suitable electronic device structures. Openings 32 may be used to form a speaker port, may be used to form a button opening, may be used to form a passageway to accommodate input-output port connectors, may be used to form a cosmetic feature, or may otherwise be used in device 6. If desired, features that are not surrounded an all sides by portions of workpiece 48 may be formed using water jet cutting. For example, notches such as a notch in the position illustrated by dashed line 33 may be formed by water jet cutting. Recesses and other features that do not pass all of the way through workpiece 48 may also be formed by water jet cutting. When conventional mechanical milling techniques are used to form speaker port openings in cover glass layers, multiple milling tool passes are typically required when forming the openings to avoid creating excessive amounts of stress in the cover glass layers. With water jet cutting techniques, throughput can be enhanced by cutting through a cover glass layer or other workpiece 48 more rapidly (e.g., in a single pass).

Water jet cutting may be used in processes such as cutting individual device-sized structures from larger structures. This process, which is sometimes referred to as singulation, may be performed before or after the larger structures have been attached to each other. For example, when using water jet cutting to singulate mother glass into device-sized display layers for display 10, the cutting process may be performed either after layers of mother glass have been laminated together or before layers of mother glass have been laminated together.

Figure 7:
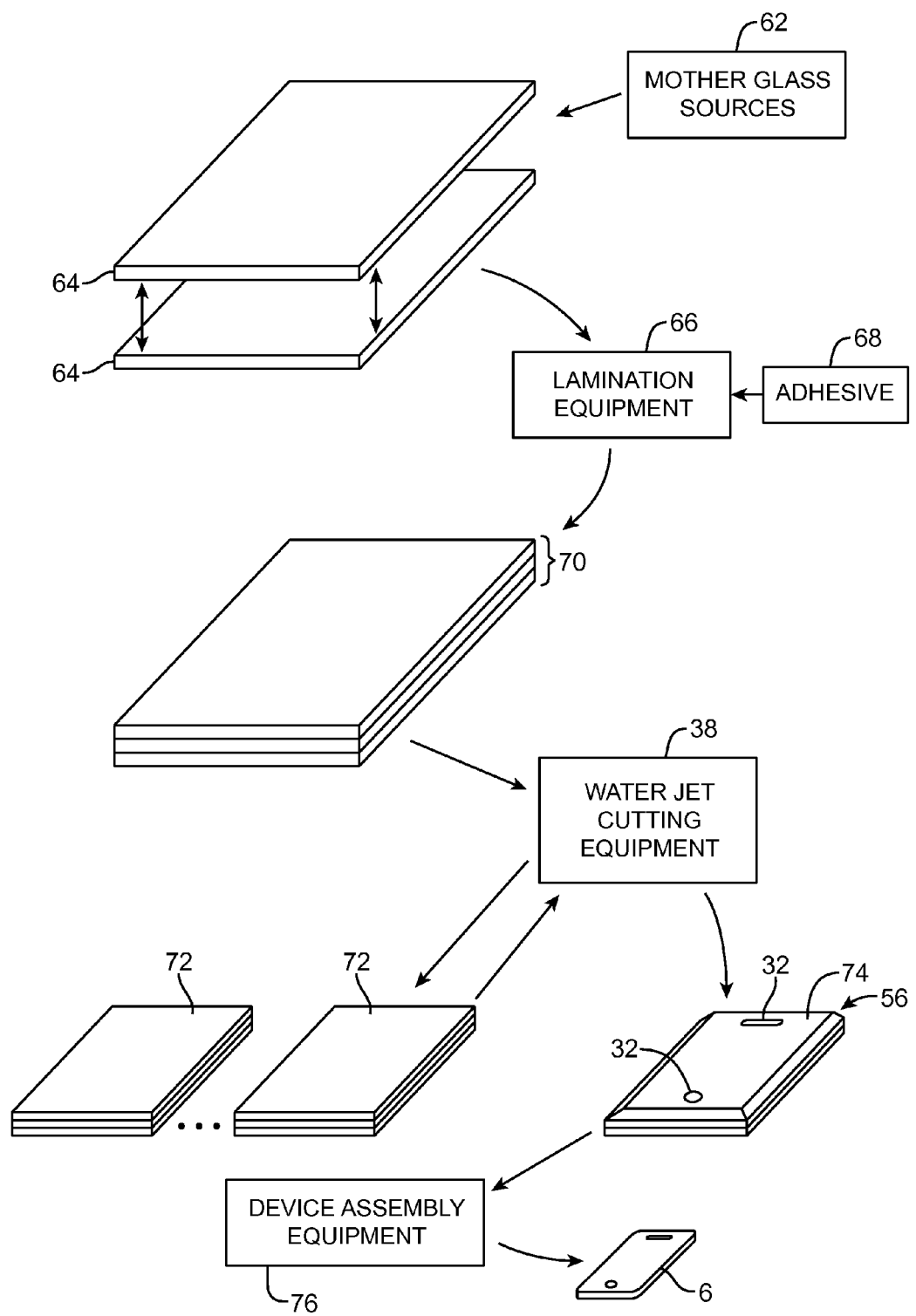
FIG. 7 is a diagram showing how water jet cutting equipment may be used in singulating structures such as laminated mother glass display structures in forming an electronic device in accordance with an embodiment of the present invention.

FIG. 7 is a diagram showing illustrative equipment and manufacturing techniques that may be used when using water jet cutting to singulate mother glass after lamination. As shown in FIG. 7, panels such as layers of mother glass 64 and sheets of other materials (sometimes collectively referred to herein as "mother glass") may be obtained from sources such as mother glass sources 62. Layers 64 may include cover layer (cover glass) mother glass, thin-film-transistor layer cover glass, color filter array mother glass, and panels for other display layers (e.g., polarizers and other optical films, touch panel layers, etc.).

Lamination equipment 66 may use adhesive 68 (e.g., pressure sensitive adhesive, liquid adhesive, optically clear adhesive, or other suitable adhesive and attachment mechanisms) in laminating layers 64 to each other to form laminated layers 70 (e.g., laminated mother glass layers and/or other layers such as other display layers). Water jet cutting equipment 38 may then be used in cutting laminated layers 70 into individual (singulated) display layer stacks 72.

As described in connection with the formation of openings 32 (see, e.g., FIG. 6) and the formation of features such as chamfer 56 of FIG. 5, water jet cutting equipment 38 may, if desired, be used to further process each of stacks 72. For example, water jet cutting equipment 38 may be used to cut openings 32 and form chamfers 56 in one or more of the layers of each stack 72 to produce processed structures such as structures 74 of FIG. 7. Structures 74 may include, for example, processed display structures such as a water-jet-cut glass layers, chamfered cover layer with openings 32, additional display layers such as a thin-film transistor layer with water-jet-cut edges, a color filter array layer with water-jet-cut edges, etc. Structures 74 may be mounted in a housing such as housing 6 of FIGS. 2A and 2B with other device components using device assembly equipment 76 to produce finished device 6.

Figure 8:
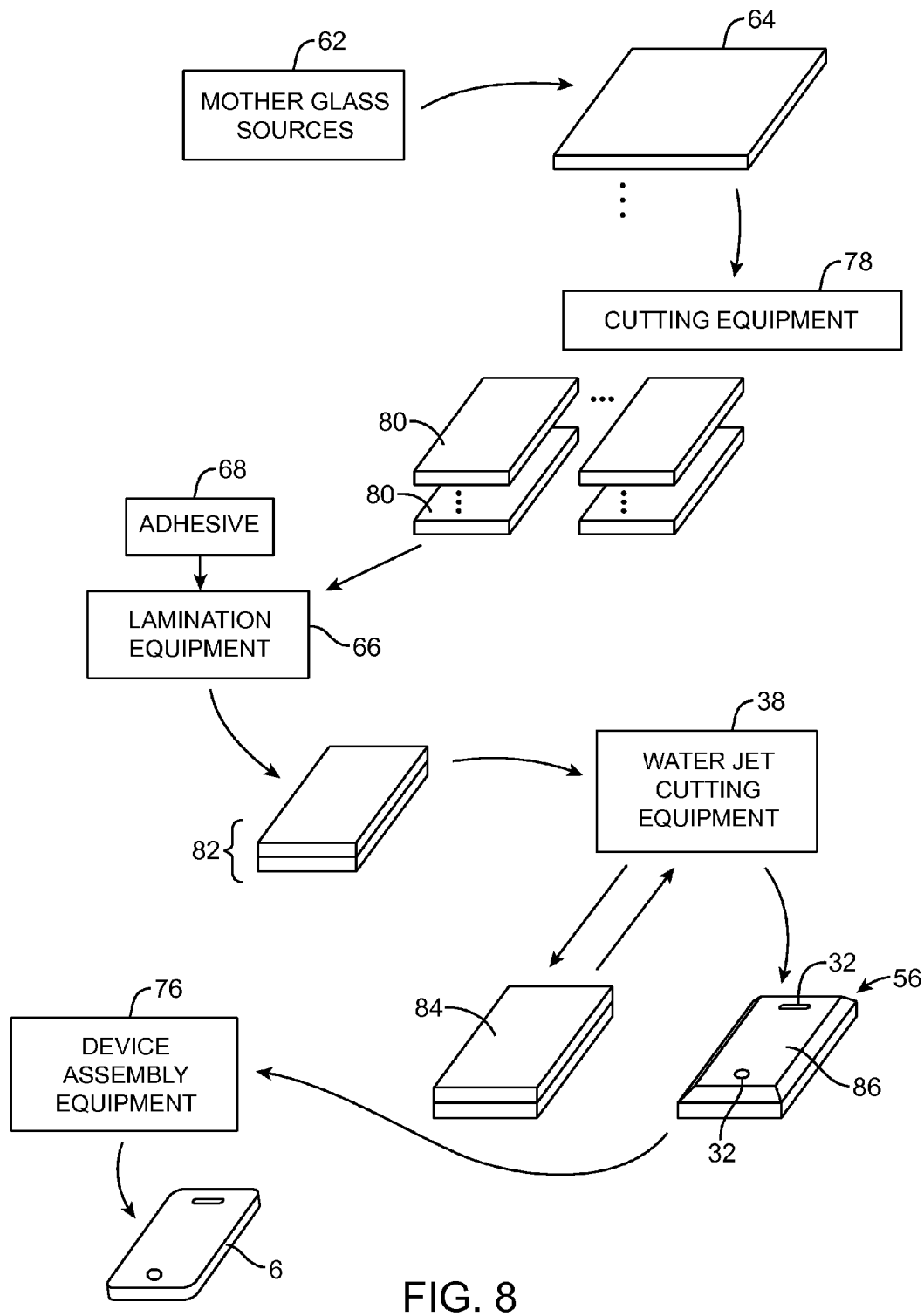
FIG. 8 is a diagram showing how water jet cutting equipment may be used in shaping structures such as singulated display structures when forming an electronic device in accordance with an embodiment of the present invention.

FIG. 8 is a diagram showing illustrative equipment and manufacturing techniques that may be used when using water jet cutting to singulate mother glass and other layers after lamination. As shown in FIG. 8, layers of material such as layers of mother glass 64 and other panels of material that have been obtained from sources such as mother glass sources 62 may be singulated using cutting equipment 78. Cutting equipment 78 may be scribe-and-break equipment, water jet cutting equipment, or other equipment that can be used to cut device-sized pieces 80 from panels of material such as mother glass 64. Layers 64 that may be singulated in this way may include cover layer (cover glass) mother glass, thin-film transistor layer cover glass, color filter array mother glass, and panels for other display layers (e.g., polarizers and other optical films, touch panel layers, etc.).

Lamination equipment 66 may use adhesive 68 to laminate singulated layers 80 to each other to form laminated structures 82 (e.g., display structures including one or more singulated display layers that have been laminated together). With one suitable arrangement, equipment 78 may cut layers 80 to approximately their intended shapes. The lamination process may then introduce potential edge misalignments. Water jet cutting equipment 38 may be used in trimming the edges of laminated structures 82 to form accurately cut laminated structures 84 (e.g., display structures or other structures whose individual layers have accurately aligned edges due to the trimming process performed by cutting through multiple layers 80 around the edges of structures 82 simultaneously, as described in connection with FIG. 4).

One or more additional passes may be made with water jet cutting equipment 38 to form features such as openings 32 and chamfer 56, thereby producing finished structures 86 (e.g., a finished set of laminated display structures or other structures including openings 32, any desired features such as chamfer 56, water-jet-cut edges, etc.). The water-jet-cut glass layers and other layers in structures 86 may include a chamfered cover layer with openings 32 and additional display layers such as a thin-film transistor layer and color filter array layer or other suitable structures. Structures 86 may be mounted in a housing such as housing 6 of FIGS. 2A and 2B with other device components using device assembly equipment 76 to produce finished device 6.

The foregoing is merely illustrative of the principles of this invention and various modifications can be made by those skilled in the art without departing from the scope and spirit of the invention. The foregoing embodiments may be implemented individually or in any combination.

What is claimed is:

1. A method of forming electronic device display structures, comprising:
    obtaining at least one display layer; and
    water jet cutting through the display layer to form the electronic device display structures, wherein water jet cutting through the display layer comprises water jet cutting through at least one layer selected from the group consisting of: a color filter layer and a thin-film transistor layer.

2. The method defined in claim 1 wherein obtaining the at least one display layer comprises obtaining a plurality of display layers and wherein water jet cutting through the display layer comprises simultaneously water jet cutting through each of the plurality of display layers.

3. The method defined in claim 1 wherein obtaining the at least one display layer comprises obtaining a panel of display cover layer material and wherein cutting through the display layer comprises singulating a plurality of cover layer pieces from the panel of display cover layer material.

4. The method defined in claim 1 wherein obtaining the at least one display layer comprises obtaining a mother glass layer and wherein cutting through the display layer comprises singulating at least one cover glass structure from the mother glass layer.

5. The method defined in claim 4 further comprising water jet cutting a chamfer in the cover glass structure.

6. The method defined in claim 4 further comprising water jet cutting at least one opening in the cover glass structure.

7. The method defined in claim 6 wherein water jet cutting the at least one opening comprises water jet cutting an opening selected from the group consisting of: a speaker port and a button opening.

8. The method defined in claim 1 wherein the display layer comprises a cover glass layer and wherein water jet cutting through the display layer comprises simultaneously water jet cutting through the cover glass layer and the at least one layer.

9. The method defined in claim 1 wherein the display layer comprises glass and wherein water jet cutting through the display layer comprises simultaneously water jet cutting through the glass and a material selected from the group consisting of: polymer, metal, ceramic, and fiber-based composite.

10. The method defined in claim 9 wherein the material comprises an electronic device housing structure and wherein simultaneously water jet cutting through the glass and the material comprises simultaneously water jet cutting through the glass and the electronic device housing structure.

11. The method defined in claim 1 wherein obtaining the at least one display layer comprises obtaining at least two display layers, the method further comprising:
    laminating the at least two display layers together using adhesive.

12. The method defined in claim 1 further comprising:
    laminating a plurality of mother glass layers together, wherein obtaining the at least one display layer comprises obtaining the laminated plurality of mother glass layers, wherein water jet cutting through the display layer comprises simultaneously water jet cutting through each of the plurality of laminated mother glass layers to form the electronic device display structures, and wherein the electronic device display structures have at least one curved edge.

13. The method defined in claim 12 wherein the mother glass layers include at least one layer selected from the group consisting of: a cover glass mother glass layer, a color filter array mother glass layer, and a thin-film-transistor mother glass layer.

14. The method defined in claim 1 wherein water jet cutting through the display layer comprises water jet cutting through a color filter layer.

15. A method for forming an electronic device display, comprising:
- laminating a plurality of display layers together using adhesive;
- water jet cutting through at least one of the plurality of display layers; and
- water jet cutting at least one opening in at least one of the plurality of display layers, wherein water jet cutting through the at least one of the plurality of display layers comprises water jet cutting through a color filter layer.

16. The method defined in claim 15 wherein water jet cutting through at least one of the plurality of display layers comprises simultaneously cutting through at least two of the plurality of display layers.

17. The method defined in claim 16 further comprising:
- water jet cutting a chamfer in at least one of the display layers.

* * * * *